United States Patent [19]

Parkell et al.

[11] Patent Number: 4,462,519

[45] Date of Patent: Jul. 31, 1984

[54] GLASS CONTAINER PUSHER

[75] Inventors: Edward Parkell, Millville; Albert J. Tamagni, Vineland, both of N.J.

[73] Assignee: Maul Technology Corporation, Millville, N.J.

[21] Appl. No.: 404,937

[22] Filed: Aug. 3, 1982

[51] Int. Cl.³ .............................................. B65G 25/00
[52] U.S. Cl. ..................................... 198/490; 65/277; 198/740
[58] Field of Search ............... 198/488, 490, 493, 740; 65/209, 227, 260, 375

[56] References Cited

U.S. PATENT DOCUMENTS

| 3,559,537 | 2/1971 | Faure | 198/490 X |
| 3,595,365 | 7/1971 | Faure | 198/490 |
| 3,595,367 | 7/1971 | Faure | 198/490 |
| 3,779,362 | 12/1973 | Horn | 198/490 |
| 4,203,752 | 5/1980 | Becker et al. | 198/740 X |
| 4,313,750 | 2/1982 | Lulejian et al. | 65/160 |
| 4,340,413 | 7/1982 | Rowland | 198/490 X |

Primary Examiner—Joseph E. Valenza
Assistant Examiner—Stuart Millman
Attorney, Agent, or Firm—Seidel, Gonda & Goldhammer

[57] ABSTRACT

A pusher is disclosed for transferring plural glass containers onto a conveyor. The pusher includes a finger for each glass container. Each finger is separately retractable after its container has been transferred onto a conveyor so as to prevent a collision between the second container and the finger for the first container.

10 Claims, 5 Drawing Figures

GLASS CONTAINER PUSHER

BACKGROUND

Pushers for transferring plural glass containers onto a conveyor are well known. For example, see U.S. Pat. No. 3,779,362 wherein fingers traverse an arc of about 90° and push plural containers from a deadplate onto a conveyor. When the containers are on the conveyor, it is necessary to retract or elevate the pushers so that the second container does not collide with the finger pushing the first container. All fingers have a common actuator in said patent. Very exact timing is required for retracting the fingers and is attained by a cam control.

The modern trend of design involves computerized controls of components of a glassware forming machine. For example, see U.S. Pat. Nos. 4,203,752 and 4,313,750 wherein the conventional cam is eliminated and electrical motors are utilized to oscillate the pusher. Eliminating the cam control requires that a new control be provided. Accomplishing such control of the fingers by electronics is possible but is complicated and expensive since each finger does not move through the same arc.

The present invention is directed to solution of the problem of how to provide control of the retraction of the fingers in a reliable manner at the proper time without using electronic circuitry or cams.

SUMMARY OF THE INVENTION

The present invention is directed to a pusher for transferring plural containers onto a conveyor. The pusher includes a plurality of motors on a common support for movement therewith about a vertical axis and through an arc. A rod is associated with each motor. A discrete finger is coupled to a free end of each rod. Each motor is adapted to reciprocate its rod between extended and retracted positions. Means is provided for enabling each rod to be independently moved to its retracted position after the rod has traversed a sufficient portion of the arc and a container pushed thereby has been transferred onto a conveyor.

It is an object of the present invention to provide a pusher for transferring plural glass containers onto a conveyor with accurate control that does not rely on a cam and which is compatible with a computerized control.

It is an object of the present invention to transfer plural glass containers onto a conveyor by independently operable motors so as to prevent collision between one container on the conveyor and a pusher finger associated with another container.

Other objects and advantages appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
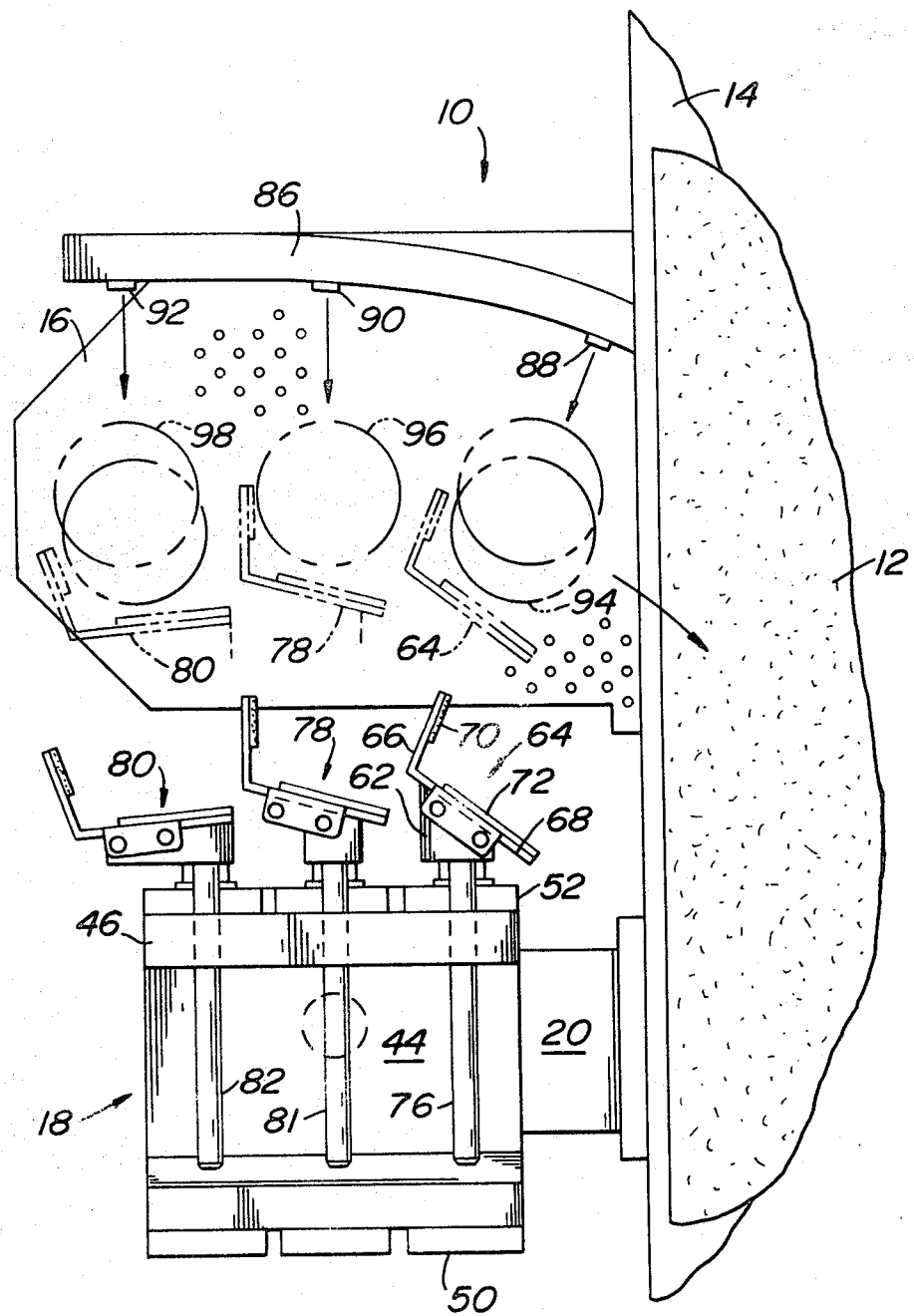
FIG. 1 is a top plan view of apparatus in accordance with the present invention at one end of its arc.

Referring to the drawing detail, wherein like numerals indicate like elements, there is shown in FIG. 1 apparatus designated generally as 10. The apparatus 10 is part of a glassware forming apparatus and includes a conveyor 12 supported by a frame 14. The frame 14 supports a deadplate 16. Deadplate 16 is hollow and preferably perforated so that cooling air issues upwardly to cool glass containers which are positioned on the deadplate 16 by takeout tongs or the like. A pusher 18 is supported by the frame 14 for transferring plural glass containers from the deadplate 16 onto the conveyor 12. The pusher 18 may be left hand or right hand. For purposes of illustration, the pusher 18 is left hand.

Figure 3:
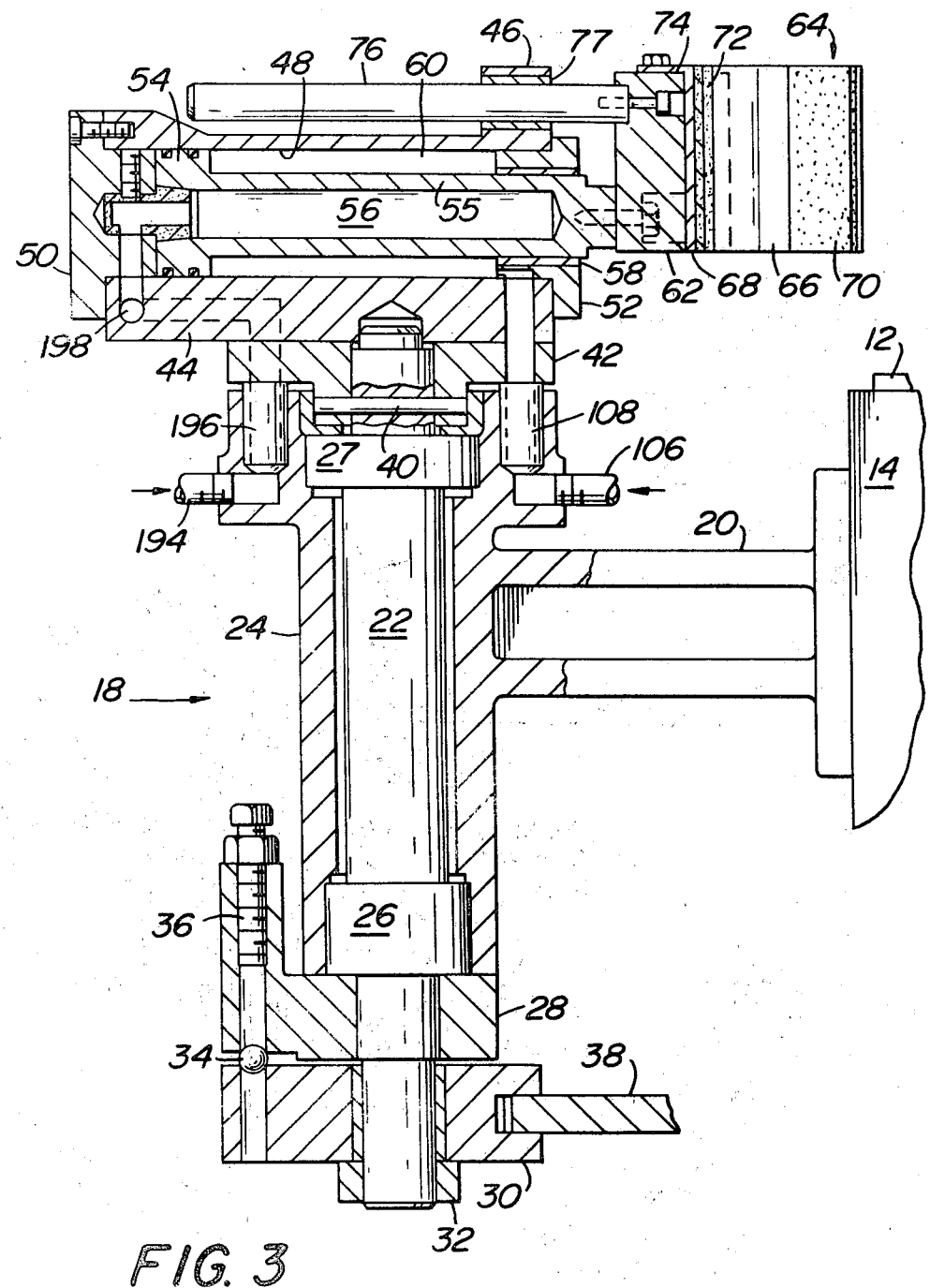
FIG. 3 is a sectional view taken along the line 3—3 in FIG. 2.

Referring to FIG. 3, the pusher 18 includes a cantilever bracket 20 removably attached to the vertical side face of frame 14. Bracket 20 is connected to a vertically disposed sleeve 24 and supports such sleeve. A shaft 22 is disposed in sleeve 24 and supported by way of upper bearing 27 and lower bearing 26. Below the bearing 26, shaft 22 is fixedly connected to a first plate 28 of an overriding clutch. A second plate of said clutch is rotatably mounted on shaft 22 and held in place by collar 32. Plates 28 and 30 are held together by way of ball 34 which in turn is adjustable by way of pin 36 threaded to plate 28. The periphery of plate 30 is driven in any convenient manner by an electrical motor. As illustrated, the plate 30 has a gear segment on its outer periphery meshed with an input gear 38. Gear 38 is oscillatable about a vertical axis by a reversable electrical motor not shown.

The upper end of shaft 22 is coupled to a base plate 42 in any convenient positive manner such as by pin 40. Plate 42 is bolted to the bottom of a horizontally disposed body 44. The body 44 supports a plurality of parallel pneumatic motors A, B and C. The pneumatic motors are identical. Hence, only one pneumatic motor A will be described in detail.

Each pneumatic motor on the body 44 includes a bore 48 closed at one end by an end cap 50 bolted to the body 44. A front end of each bore is closed by an end cap 52 bolted to the body 44. A piston 54 is positioned in bore 48. Piston 54 has a hollow piston rod 55. The hollow interior 56 of rod 55 reduces the mass and weight which must be oscillated. Rod 55 is guided by bushing 58 mounted in a hole in cap 52. Piston 54 is guided by the bore 48. Bore 48 cooperates with the outer periphery of rod 55 to define an annular chamber 60. One surface of the piston 54 is exposed to chamber 60.

A pusher block 62 is bolted to an endface of rod 55. A pusher finger 64 is removably attached to block 62. Finger 64 has angularly disposed legs 66, 68. See FIG. 1. A resilient pad 70 is attached to leg 66. A resilient pad 72 is attached to leg 68. Leg 68 has a horizontally disposed flange 74 at its upper end. Flange 74 is removably fastened to a top surface of the pusher block 62.

The body 44 has an upstanding flange 46. Flange 46 has three horizontally disposed holes, one for each pneumatic motor. A guide bushing 77 is disposed in each hole. A guide rod 76 extends through bushing 77 and is attached at one end to the pusher block 62. See FIGS. 1 and 3.

The fingers associated with the motors B and C are identical with finger 64. The guide blocks associated with the motors B and C are slightly different in configuration so as to support the fingers 64, 78 and 80 at the different angular positions as shown in FIG. 1. Finger 78 has a guide rod 81 and finger 80 has a guide rod 82.

The fingers 64, 78 and 80 are adapted to be extended from their retracted solid line position shown in FIG. 1 to the phantom position shown in FIG. 1. On the side of the deadplate 16 remote from the pusher 18, there is provided an air distribution manifold 86. Manifold 86 has a nozzle 88 for directing pressurized air toward the finger 64, a nozzle 90 for directing pressurized air toward the finger 78, and a nozzle 92 for directing pressurized air toward the finger 80.

Figure 4:
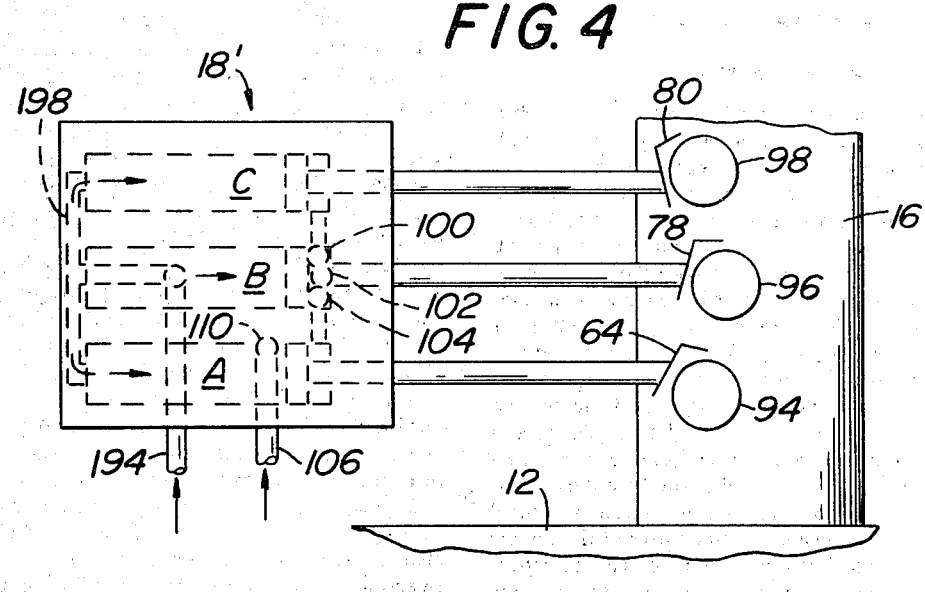
FIGS. 4 and 5 are diagramatic plan views of the pusher for illustrating air flow for actuating the pusher.

Air for extending the piston rods from the solid line position of FIG. 1 to the phantom position of FIG. 1 is supplied by valved conduit 194; through seal 196 to manifold 198 in body 44. See FIGS. 3 and 4. When body 44 is in the position shown in FIG. 1, the front ends of the motors are vented to atmosphere via ports 100, 102, 104. Body 44 is internally channeled to communicate port 100 with the front end of motor C, port 102 with the front end of motor B, and port 104 with chamber 60 at the front end of motor A.

Figure 5:
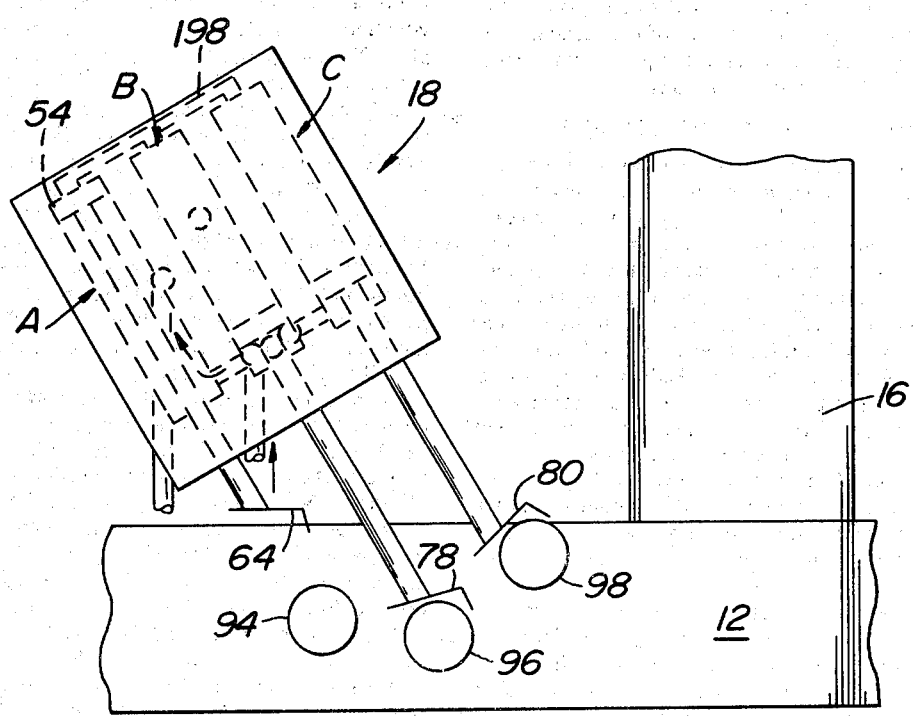

Air for retracting the piston rods is supplied by valved conduit 106, through seal 108 to the port 110. Ports 100, 102, 104 are equidistant from the axis of shaft 22. When port 104 overlies and communicates with port 110 as shown in FIG. 5, air is supplied from conduit 106 to chamber 60 to cause piston 54 to retract to the position shown in FIG. 3. As soon as body 44 is rotated from the position shown in FIGS. 1 and 4, the manifold 198 communicates with a valve-free exhaust and no longer communicates with conduit 194. When port 102 communicates with port 110, the piston of motor B is retracted. When port 100 communicates with port 110, the piston of motor C is retracted.

In use, assume that the fingers are in their retracted solid line positions as shown in FIG. 1. Take out tongs or the like simultaneously transfers containers 94, 96 and 98 onto the deadplate 16. Air is introduced into the motors A, B and C via conduit 194 and manifold 198 to cause the pistons and their associated rods to move to an extended position thereby placing the fingers 64, 78 and 80 in the phantom position shown in FIG. 1. The front ends of the pistons are vented via ports 100, 102 and 104. Pressurized air is discharged from the nozzles 88, 90 and 92 to direct the respective containers 94, 96 and 98 into contact with their associated fingers 64, 78 and 80 respectively. Thereafter, gear 38 rotates the plate 30 which causes the shaft 22 and body 44 to pivot through an arc.

Figure 2:
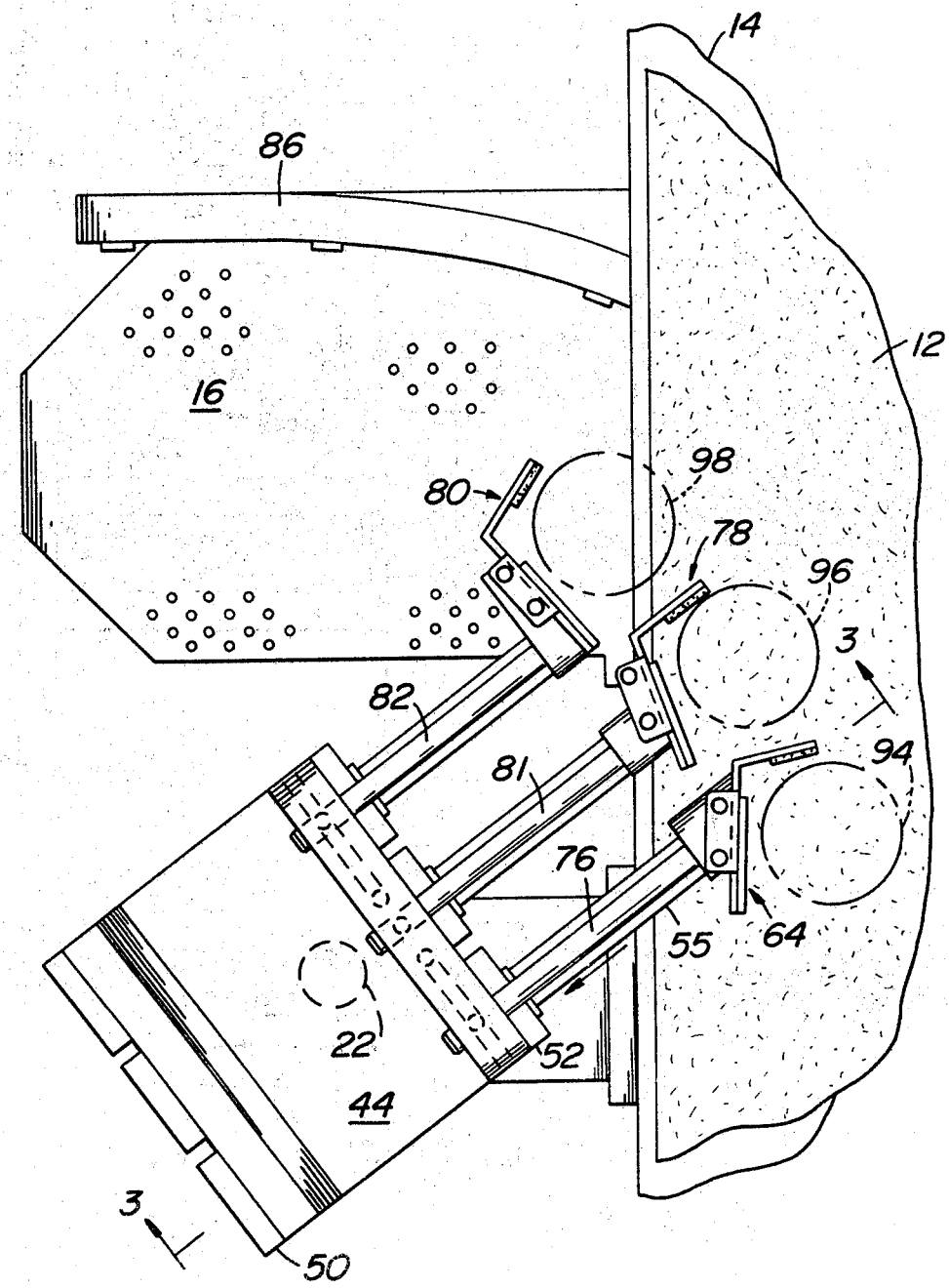
FIG. 2 is a view similar to FIG. 1 but showing the pusher transferring plural glass containers onto a conveyor.

Referring to FIG. 2, when the body 44 has pivoted through an arc of 50°, the container 94 will be in the position shown in FIG. 2 and port 104 will overlie port 110. Thereafter, the piston 54 and its finger 64 will be retracted. The body 44 continues to pivot. After it has pivoted through an arc of 75°, port 102 will overlie port 110 whereby the piston of motor B and its associated finger 78 will retract. After the body 44 has pivoted through an arc of 105°, port 100 will overlie port 110 whereby the piston of motor C and its associated with finger 80 will retract. Thereafter, the entire body 44 with all fingers in their retracted position, will pivot back to the starting position as shown in FIG. 1 by reversing the direction of rotation of gear 38. Thereafter, the process will be repeated.

The present invention may be embodied in other specific forms without departing from the spirit or essential attributes thereof and, accordingly, reference should be made to the appended claims, rather than to the foregoing specification, as indicating the scope of the invention.

We claim:

1. A pusher for transferring plural containers onto a conveyor comprising a plurality of motors on a common support for movement therewith, means for oscillating said support through an arc, a discrete rod associated with each motor, a discrete finger attached to a free end of each rod, each motor being adapted to reciprocate its rod between extended and retracted positions with respect to said body, and means for causing each rod to be sequentially and independently moved by its motor to its retracted position after each rod has traversed a sufficient portion of the arc so that a container pushed thereby has transferred onto a conveyor.

2. A pusher in accordance with claim 1 including a discrete guide member coupled to each finger and guided by said common support, each guide member being parallel to its associated rod.

3. A pusher in accordance with claim 1 including an air manifold having a discrete nozzle associated with each finger for directing air at containers to be pushed by the fingers.

4. A pusher in accordance with claim 1 where the finger pushing surfaces are each disposed at a different angle with respect to their associated rods.

5. A pusher in accordance with claim 1 wherein said last mentioned means retracts one of said fingers after it has moved through an arc of about 50° and then retracts a second finger after it has moved through an arc of about 75° and then retracts a third finger after it has moved through an arc of about 105°.

6. A pusher in accordance with claim 1 wherein each motor is a pneumatic motor having a piston, each piston being connected to one of said rods, each rod being guided directly by a portion of said body.

7. A pusher in accordance with claim 6 wherein each rod is hollow adjacent the end thereof connected to its associated piston.

8. A pusher for transferring plural containers onto a conveyor comprising a plurality of motors on a common support for movement therewith, means for oscillating said support through an arc, a discrete rod associated with each motor, each motor being a pneumatic motor having a piston, each piston being connected to one of said rods, each rod being guided directly by a portion of said body, a discrete finger attached to a free end of each rod, the finger pushing surfaces being disposed at a different angle with respect to their associated rods, each motor being adapted to reciprocate its rod between extended and retracted positions with respect to said body, and means for causing each rod to be sequentially and independently moved by its motor to its retracted position after each rod has traversed a predetermined portion of the arc wherein a container pushed thereby has transferred onto a conveyor.

9. A pusher in accordance with claim 8 including an air manifold having a discrete nozzle associated with each finger for directing air at containers to be pushed by the fingers and while the containers are on a dead plate.

10. A pusher in accordance with claim 8 wherein said last mentioned means retracts one of said fingers after it has moved through an arc of about 50° and then retracts a second finger after it has moved through an arc of about 75° and then retracts a third finger after it has moved through an arc of about 105°.

* * * * *